United States Patent

Hamamoto et al.

(10) Patent No.: US 6,503,662 B1
(45) Date of Patent: Jan. 7, 2003

(54) NON-AQUEOUS ELECTROLYTE AND LITHIUM SECONDARY BATTERY USING THE SAME

(75) Inventors: Toshikazu Hamamoto, Ube (JP); Koji Abe, Ube (JP); Yasuo Matsumori, Ube (JP)

(73) Assignee: UBE Industries, LTD. (JP)

( * ) Notice: Subject to any disclaimer, the term of this patent is extended or adjusted under 35 U.S.C. 154(b) by 0 days.

(21) Appl. No.: 09/665,793

(22) Filed: Sep. 20, 2000

(30) Foreign Application Priority Data

Sep. 30, 1999 (JP) .......................................... 11-280014
Jun. 7, 2000 (JP) ...................................... 2000-170565

(51) Int. Cl.⁷ ............................................... H01M 6/16
(52) U.S. Cl. ....................... 429/326; 429/307; 429/322; 429/223; 429/231.1; 429/231.8; 429/231.95
(58) Field of Search ................................. 429/326, 307, 429/322, 223, 231.1, 231.8, 231.95

(56) References Cited

U.S. PATENT DOCUMENTS

| 5,922,494 A | 7/1999 | Barker et al. | 429/342 |
| 6,074,777 A | 6/2000 | Reimers et al. | 429/61 |

FOREIGN PATENT DOCUMENTS

| JP | 60134070 A | * 7/1985 | ............. D01F/8/14 |
| JP | A-5-36439 | 2/1993 | |
| JP | A-10-74537 | 3/1998 | |
| JP | A-10-275632 | 10/1998 | |

* cited by examiner

*Primary Examiner*—Laura Weiner
(74) *Attorney, Agent, or Firm*—Morgan, Lewis & Bockius LLP

(57) ABSTRACT

A non-aqueous electrolyte containing a non-aqueous solvent, an electrolyte salt dissolved therein and a tert-butylbenzene derivative having the formula (I):

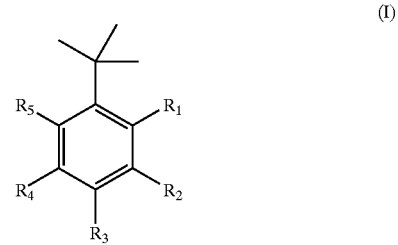

wherein $R_1$, $R_2$, $R_3$, $R_4$ and $R_5$ independently represent a hydrogen atom or $C_1$ to $C_{12}$ hydrocarbon group and a lithium secondary battery using the same.

18 Claims, No Drawings

NON-AQUEOUS ELECTROLYTE AND LITHIUM SECONDARY BATTERY USING THE SAME

BACKGROUND OF THE INVENTION

1. Field of the Invention

The present invention relates a non-aqueous electrolyte capable of providing a lithium secondary battery superior in the cycle characteristics and the battery characteristics such as the electric capacity and storage characteristics and a. lithium secondary battery using the same.

2. Description of the Related Art

In recent years, lithium secondary batteries have been widely used as sources of power for driving compact electronic devices etc. A lithium secondary battery is mainly composed of a cathode, a non-aqueous electrolyte and an anode. In particular, a lithium secondary battery using a lithium complex oxide such as $LiCoO_2$ as a cathode and a carbonaceous material or lithium metal as an anode is suitably being used. Further, as the non-aqueous electrolyte for such a lithium secondary battery, a carbonate such as ethylene carbonate (EC) or propylene carbonate (PC) and an electrolyte salt such as a lithium salt are suitably used.

However, a secondary battery having more superior characteristics in the cycle characteristics of the battery and the battery characteristics such as the electric capacity has been required.

In a lithium secondary battery using, for example, $LiCoO_2$, $LiMn_2O_4$, $LiNiO_2$, as the cathode, the solvent in the non-aqueous electrolyte is locally partially oxidized and decomposed at the time of charging. The decomposed products inhibit the desirable electrochemical reaction of the battery, and therefore, causes a decrease in the battery characteristics. This is believed due to the electrochemical oxidation of the solvent at the interface between the cathodic material and the non-aqueous electrolyte.

Further, in a lithium secondary battery using, for example, a highly crystallized carbonaceous material such as natural graphite or artificial graphite as the anode, the solvent in the non-aqueous electrolyte is reduced and decomposed at the anode surface at the time of charging. Furthermore, in EC, which is generally broadly used as a solvent for a non-aqueous electrolyte, partial reduction and decomposition occur during the repeated charging and discharging and, therefore, the battery performance is decreased. Thus, the cycle characteristics of the battery and the battery characteristics such as the electric capacity are not necessarily satisfactory.

SUMMARY OF THE INVENTION

The objects of the present invention are to solve the above-mentioned problems relating to the non-aqueous electrolyte for a lithium secondary battery and to provide a non-aqueous electrolyte for a lithium secondary battery capable of providing a lithium secondary battery superior in the cycle characteristics of the battery and the battery characteristics such as the electric capacity and storage characteristics in the charging state and also to provide a lithium secondary battery using the same.

In accordance with the present invention, there is provided a non-aqueous electrolyte comprising a non-aqueous solvent, an electrolyte salt dissolved therein and a tert-butylbenzene derivative having the formula (I):

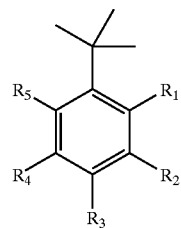
(I)

wherein $R_1$, $R_2$, $R_3$, $R_4$ and $R_5$ independently represent a hydrogen atom or $C_1$ to $C_{12}$ hydrocarbon group.

In accordance with the present invention, there is also provided a lithium secondary battery comprising a cathode, an anode, and a non-aqueous electrolyte comprising a non-aqueous solvent, an electrolyte salt dissolved therein and a tert-butylbenzene derivative having the formula (I):

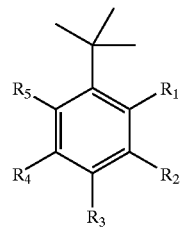
(I)

wherein $R_1$, $R_2$, $R_3$, $R_4$ and $R_5$ independently represent a hydrogen atom or $C_1$ to $C_{12}$ hydrocarbon group.

The non-aqueous electrolyte of the present invention is used as a component of a lithium secondary battery. The components of the lithium secondary battery other than the non-aqueous electrolyte are not particularly limited. Various components generally used in the past may be used.

In this specification and in the claims which follow, the singular forms "a", "an" and "the" include plural referents unless the context clearly dictates otherwise.

DETAILED DESCRIPTION OF THE PRESENT INVENTION

In the tert-butylbenzene derivative having the above formula (I) contained in the non-aqueous electrolyte containing the non-aqueous solvent and the electrolyte salt dissolved therein, $R_1$, $R_2$, $R_3$, $R_4$ and $R_5$ are independently a hydrogen atom; a linear alkyl group such as a methyl group, ethyl group, propyl group and butyl group; or a branched alkyl group such as an isopropyl group, isobutyl group, sec-butyl group, and tert-butyl group. Further, it may be a $C_3$ to $C_6$ cycloalkyl group such as a cyclopropyl group and cyclohexyl group. Further, it may be a phenyl group, benzyl group, or an alkyl-group substituted phenyl group or benzyl group such as a tolyl group, tert-butylphenyl group, or tert-butyl benzyl group. It preferably has a $C_1$ to $C_{12}$ hydrocarbon group.

As specific examples of the tert-butyl benzene derivative having the above formula (I), for example, tert-butylbenzene (i.e., $R_1=R_2=R_3=R_4=R_5$=hydrogen atom), 2-tert-butyltoluene (i.e., $R_1$=methyl group, $R_2=R_3=R_4=R_5$=hydrogen atom), 3-tert-butyltoluene (i.e., $R_2$=methyl group, $R_1=R_3=R_4=R_5$=hydrogen atom), 4-tert-butyltoluene (i.e., $R_3$=methyl group, $R_1=R_2=R_4=R_5$=hydrogen atom), 1-(tert-butyl)-2-ethylbenzene (i.e., $R_1$=ethyl group, $R_2=R_3=R_4=R_5$=hydrogen atom), 1-(tert-butyl)-3- ethylbenzene (i.e., $R_2$=ethyl group, $R_1$=$R_3$=$R_4$=$R_5$=hydrogen atom), 1-(tert-butyl)-4-ethylbenzene(i.e., $R_3$=ethyl group, $R_1$=$R_2$=$R_4$=$R_5$=hydrogen atom), 3-tert-butyl-o-xylene(i.e., $R_1$=$R_2$=methyl group, $R_3$=$R_4$=$R_5$=hydrogen atom), 4-tert-butyl-o-xylene(i.e., $R_2$=$R_3$=methyl group, $R_1$=$R_4$=$R_5$=hydrogen atom), 4-tert-butyl-m-xylene (i.e., $R_1$=$R_3$=methyl group, $R_2$=$R_4$=$R_5$=hydrogen atom), 5-tert-butyl-m-xylene(i.e., $R_2$=$R_4$=methyl group, $R_1$=$R_3$=$R_5$=hydrogen atom), 2-tert-butyl-p-xylene(i.e., $R_1$=$R_4$=methyl group, $R_2$=$R_3$=$R_5$=hydrogen atom), 3-iso-propyl-1-tert-butylbenzene (i.e., $R_2$=iso-propyl group, $R_1$=$R_3$=$R_4$=$R_5$=hydrogen atom), 4-iso-propyl-1-tert-butylbenzene(i.e., $R_3$=iso-propyl group, $R_1$=$R_2$=$R_4$=$R_5$=hydrogen atom), 4-n-butyl-1-tert-butylbenzene(i.e., $R_3$=n-butyl group, $R_1$=$R_2$=$R_4$=$R_5$=hydrogen atom), 4-iso-butyl-1-tert-butylbenzene(i.e., $R_3$=iso-butyl group, $R_1$=$R_2$=$R_4$=$R_5$=hydrogen atom), 4-sec-butyl-1-tert-butylbenzene(i.e., $R_3$=sec-butyl group, $R_1$=$R_2$=$R_4$=$R_5$=hydrogen atom), 3-cyclohexyl-1-tert-butylbenzene(i.e., $R_2$=cyclohexyl group, $R_1$=$R_3$=$R_4$=$R_5$=hydrogen atom), 4-cyclohexyl-1-tert-butylbenzene(i.e., $R_3$=cyclohexyl group, $R_1$=$R_2$=$R_4$=$R_5$=hydrogen atom), 4,4'-di-tert-butyldiphenylmethane(i.e., $R_3$=4-tert-butylbenzyl group, $R_1$=$R_2$=$R_4$=$R_5$=hydrogen atom), 4,4'-di-tert-butylbiphenyl(i.e., $R_3$=4-tert-butylphenyl group, $R_1$=$R_2$=$R_4$=$R_5$=hydrogen atom), 1,3-di-tert-butylbenzene(i.e., $R_2$=tert-butyl group, $R_1$=$R_3$=$R_4$=$R_5$=hydrogen atom), 1,4-di-tert-butylbenzene(i.e., $R_3$=tert-butyl group, $R_1$=$R_2$=$R_4$=$R_5$=hydrogen atom), 1,2,4-tri-tert-butylbenzene(i.e., $R_1$=$R_3$=tert-butyl group, $R_2$=$R_4$=$R_5$=hydrogen atom), 1,2,3-tri-tert-butylbenzene(i.e., $R_1$=$R_2$=tert-butyl group, $R_3$=$R_4$=$R_5$=hydrogen atom), 1,3,5-tri-tert-butylbenzene(i.e., $R_2$=$R_4$=tert-butyl group, $R_1$=$R_3$=$R_5$=hydrogen atom), 1,2,3,5-tetra-tert-butylbenzene(i.e., $R_1$=$R_2$=$R_4$=tert-butyl group, $R_3$=$R_5$=hydrogen atom), 1,2,3,4-tetra-tert-butylbenzene(i.e., $R_1$=$R_2$=$R_3$=tert-butyl group, $R_4$=$R_5$=hydrogen atom), 1,2,4,5-tetra-tert-butylbenzene(i.e., $R_1$=$R_3$=$R_4$=tert-butyl group, $R_2$=$R_5$=hydrogen atom), 3,5-di-tert-butyltoluene (i.e., $R_2$=methyl, $R_4$=tert-butyl group, $R_1$=$R_3$=$R_5$=hydrogen atom), etc. may be mentioned.

If the content of the tert-butylbenzene derivative having the formula (I) contained in the non-aqueous electrolyte is excessively large, the battery characteristics is sometimes decreased, while if excessively small, the desired sufficient battery characteristics cannot be obtained. Therefore, the content thereof is 0.1 to 20% by weight based upon the weight of the non-aqueous electrolyte, preferably 0.2 to 10% by weight, particularly preferably 0.5 to 5% by weight, in which ranges the cycle characteristics are improved.

The non-aqueous solvent used in the present invention is preferably composed of a high dielectric constant solvent and a low viscosity solvent.

As the high dielectric constant solvent, for example, cyclic carbonates such as ethylene carbonate (EC), propylene carbonate (PC), butylene carbonate (BC) and vinylene carbonate (VC) may be suitably mentioned. These high dielectric constant solvents may be used alone or in any combination thereof.

As the low viscosity solvent, for example, linear carbonates such as dimethyl carbonate (DMC), methylethyl carbonate (MEC), and diethyl carbonate (DEC); ethers such as tetrahydrofuran, 2-methyl tetrahydrofuran, 1,4-dioxane, 1,2-dimethoxyethane, 1,2-diethoxyethane and 1,2-dibutoxyethane; lactones such as γ-butyrolactone; nitrites such as acetonitrile; esters such as methyl propionate; and amides such as dimethyl formamide may be mentioned. These low viscosity solvents may be used alone or in any combination thereof.

The high dielectric constant solvent and the low viscosity solvent are freely selected and combined for use. Note that the high dielectric constant solvent and low viscosity solvent are used in a ratio by volume (high dielectric constant solvent:low viscosity solvent) of usually 1:9 to 4:1, preferably 1:4 to 7:3.

As the electrolyte salt used in the present invention, for example, $LiPF_6$, $LiBF_4$, $LiClO_4$, $LiN(SO_2CF_3)_2$, $LiN(SO_2C_2F_5)_2$, $LiC(SO_2CF_3)_3$, $LiPF_3(CF_3)_3$, $LiPF_3(C_2F_5)_3$, $LiPF_4(C_2F_5)_2$, $LiPF_3(iso-C_3F_7)_3$, $LiPF_5(iso-C_3F_7)$, etc. may be mentioned. These electrolyte salt may be used alone or in any combination thereof. These electrolyte salt are normally used in the dissolved form in the non-aqueous solvent at a concentration of 0.1 to 3M, preferably 0.5 to 1.5M.

The non-aqueous electrolyte of the present invention can be obtained, for example, by mixing the above high dielectric constant solvent and low viscosity solvent, dissolving the electrolyte salt therein and dissolving the tert-butylbenzene derivative having the formula (I) therein.

For example, as the cathode active material, a complex metal oxide of at least one metal selected from the group comprising cobalt, manganese, nickel, chrome, iron and vanadium with lithium may be used. As such a complex metal oxide, for example, $LiCoO_2$, $LiMn_2O_4$, $LiNiO_2$, $LiNi_{0.8}CO_{0.2}O_2$, etc. may be mentioned. These cathode active materials may be used alone or in any combination thereof.

The cathode is prepared by mixing the cathode active material with a conductive agent such as acetylene black or carbon black, a binder such as polytetrafluoroethylene (PTFE) and polyvinylidene fluoride (PVDF), and a solvent to form a cathode paste, then coating the resultant cathode paste on a collector such as aluminum foil or a stainless steel lath, drying and compression molding the same, followed by heat treating at a temperature of about 50 to 250° C. for about 2 hours, for example, under a vacuum.

As the anode active material, lithium metal, a lithium alloy, a carbonaceous material having a graphite-like crystalline structure (heat cracked carbons, cokes, graphites (artificial graphite, natural graphite, etc.), organic polymer compound sintered bodies, carbon fiber), complex stannous oxides or other substances, which are capable of absorbing and releasing lithium are used. In particular, a carbonaceous material having a graphite-like crystalline structure having a lattice spacing ($d_{002}$) of the lattice face (002) of 0.335 to 0.340 nm is preferred. These anode active materials may be used alone or in any combination thereof. Note that a powder material such as a carbonaceous material is mixed with a binder such as ethylene propylene diene terpolymer (EPDM), polytetrafluoroethylene (PTFE), or polyvinylidene fluoride (PVDF) to make an anode paste. The method for producing an anode is not particularly limited. The anode may be produced by an analogous method as the above production method of the cathode.

The structure of the lithium secondary battery is not particularly limited. A coin battery having a cathode, anode, single-layer or multiple-layer permeable separator and a cylindrical battery, prismatic battery, etc. having a cathode, anode, and roll-type separator may be mentioned as examples. Note that as the separator, a known polyolefin microporous membrane, woven fabric, nonwoven fabric, etc. is used.

EXAMPLES

The present invention will now be further illustrated in detail by, but is by no means limited to, the following Examples and Comparative Examples.

Example 1

Preparation of Non-aqueous Electrolyte

A non-aqueous solvent composed of EC:PC:DEC (volume ratio)=30:5:65 was prepared. $LiPF_6$ was dissolved therein to a concentration of 1M to prepare the non-aqueous electrolyte. Then, 4-tert-butyltoluene was added thereto to become 2.0% by weight based upon the non-aqueous electrolyte.

Fabrication of Lithium Secondary Battery and Measurement of Battery Characteristics 80% by weight of $LiCoO_2$ (i.e., cathode active material), 10% by weight of acetylene black (i.e., conductive agent), and 10% by weight of polyvinylidene fluoride (i.e., binder) were mixed and diluted with 1-methyl-2-pyrrolidone solvent. The resultant paste was coated on aluminum foil, dried, compression molded, and heat treated to form the cathode. 90% by weight of artificial graphite (i.e., anode active material) and 10% by weight of polyvinylidene fluoride (i.e., binder) were mixed and diluted with 1-methyl-2-pyrrolidone solvent. The resultant paste was coated on a copper foil, dried, compression molded, and heat treated to form the anode. A coin type battery (i.e., diameter 20 mm and thickness 3.2 mm) was fabricated by using a separator of a polypropylene microporous film and by injecting the above non-aqueous electrolyte solution.

This coin battery was repeatedly charged and discharged by charging at room temperature (i.e., 20° C.) with a constant electric current (0.8 mA) to reach 4.2 V, and then the charging was continued under a constant voltage of 4.2 V for a period of 5 hours, then discharging by a constant current of 0.8 mA to the end voltage of 2.7V. The initial discharging capacity was a relative value of 1.03 compared with the case of using 1M $LiPF_6$-EC/PC/DEC (i.e., volume ratio 30/5/65) without adding 4-tert-butyltoluene as the non-aqueous electrolyte (Comparative Example 1). The battery characteristics after 50 cycles were measured, whereupon the retaining rate of the discharge capacity was 92.2% as compared with the initial discharge capacity of 100%. The fabrication conditions and battery characteristics of the coin battery are shown in Table I.

Example 2

The same procedure was followed as in Example 1 to prepare a non-aqueous electrolyte and fabricate a coin battery, except for using 5.0% by weight of 4-tert-butyltoluene based upon the non-aqueous electrolyte as the additive. The battery characteristics after 50 cycles were measured, whereupon the retaining rate of the discharge capacity was 91.7%. The fabrication conditions and battery characteristics of the coin battery are shown in Table I.

Example 3

The same procedure was followed as in Example 1 to prepare a non-aqueous electrolyte and fabricate a coin battery, except for using 0.5% by weight of 4-tert-butyltoluene based upon the non-aqueous electrolyte as the additive. The battery characteristics after 50 cycles were measured, whereupon the retaining rate of the discharge capacity was 90.1%. The fabrication conditions and battery characteristics of the coin battery are shown in Table I.

Comparative Example 1

A non-aqueous electrolyte of EC:PC:DEC (volume ratio)=30:5:65 was prepared and $LiPF_6$ dissolved therein to a concentration of 1M. At this time, no tert-butylbenzene derivative at all was added. This non-aqueous electrolyte was used to fabricate a coin battery and measure the battery characteristics in the same way as Example 1. The retaining rate of the discharge capacity after 50 cycles was 82.6% of the initial discharge capacity. The fabrication conditions and battery characteristics of the coin battery are shown in Table I.

Example 4

A non-aqueous electrolyte of EC:PC:DEC (volume ratio)=30:5:65 was prepared and $LiPF_6$ dissolved therein to a concentration of 1M to prepare a non-aqueous electrolyte, then tert-butylbenzene was added to the non-aqueous electrolyte to become 2.0% by weight. This non-aqueous electrolyte was used to fabricate a coin battery and measure the battery characteristics in the same way as Example 1. The battery characteristics were measured, whereupon the initial discharge capacity was a relative value of 1.02 compared with the use of 1M $LiPF_6$-EC/PC/DEC (volume ratio 30/5/65) without any tert-butylbenzene derivative added (Comparative Example 1). The battery characteristics after 50 cycles were measured, whereupon the retaining rate of the discharge capacity was 91.8% when compared with the initial discharge capacity as 100%. Further, the low temperature characteristics were also good. The fabrication conditions and battery characteristics of the coin battery are shown in Table I.

Example 5

The same procedure was followed as in Example 1 to prepare a non-aqueous electrolyte and fabricate a coin battery except for using 2.0% by weight of 4-tert-butyl-m-xylene based upon the non-aqueous electrolyte as the additive. The battery characteristics after 50 cycles were measured, whereupon the retaining rate of the discharge capacity was 91.6%. The fabrication conditions and battery characteristics of the coin battery are shown in Table I.

Example 6

The same procedure was followed as in Example 1 to prepare a non-aqueous electrolyte and fabricate a coin battery except for using EC/PC/DEC/DMC (volume ratio 30/5/30/35) as the non-aqueous electrolyte, and using natural graphite instead of artificial graphite as the anode active material. The battery characteristics after 50 cycles were measured, whereupon the retaining rate of the discharge capacity was 92.6%. The fabrication conditions and battery characteristics of the coin battery are shown in Table I.

Example 7

The same procedure was followed as in Example 1 to prepare a non-aqueous electrolyte and fabricate a coin battery except for using 1M $LiPF_6$-EC/PC/MEC/DMC (volume ratio 30/5/50/15) as the non-aqueous electrolyte and using $LiNi_{0.8}Co_{0.2}O_2$, instead of $LiCoO_2$, as the cathode active material. The battery characteristics after 50 cycles were measured, whereupon the retaining rate of the discharge capacity was 90.8%. The fabrication conditions and battery characteristics of the coin battery are shown in Table I.

Example 8

The same procedure was followed as in Example 1 to prepare a non-aqueous electrolyte and fabricate a coin battery except for using 1M LiBF$_4$-EC/PC/DEC/DMC (volume ratio 30/5/30/35) as the non-aqueous electrolyte and using LiMn$_2$O$_4$ instead of LiCoO$_2$ as the cathode active material. The battery characteristics after 50 cycles were measured, whereupon the retaining rate of the discharge capacity was 92.3%. The fabrication conditions and battery characteristics of the coin battery are shown in Table I.

Example 9 to Example 11

The same procedure was followed as in Example 1 to prepare a non-aqueous electrolyte and fabricate a coin battery except for using 4,4'-di-tert-butylbiphenyl, 1,3-di-tert-butylbenzene, and 1,3,5-tri-tert-butylbenzene in each Example, instead of 4-tert-butyltoluene. The battery characteristics after 50 cycles were measured. The fabrication conditions and battery characteristics of the coin batteries are shown in Table I.

Example 12

The same procedure was followed as in Example 1 to prepare a non-aqueous electrolyte and fabricate a coin battery except for using 3,5-di-tert-butyltoluene, instead of 4-tert-butyltoluene, and using natural graphite, instead of artificial graphite, as the anode active material. The battery characteristics after 50 cycles were measured. The fabrication conditions and battery characteristics of the coin battery are shown in Table I.

As explained above, according to the present invention, it is possible to provide a lithium secondary battery superior in battery cycle characteristics and battery characteristics such as the electric capacity and storage characteristics.

What is claimed is:

1. A non-aqueous electrolyte comprising a non-aqueous solvent, an electrolyte salt dissolved therein and a tert-butylbenzene derivative having the formula (I):

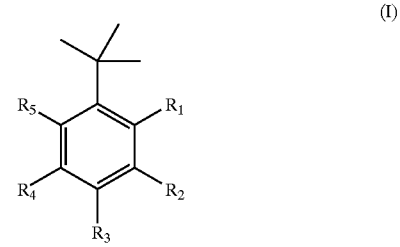

wherein $R_1$, $R_2$, $R_3$, $R_4$ and $R_5$ independently represent a hydrogen atom or $C_1$ to $C_{12}$ hydrocarbon group.

2. The non-aqueous electrolyte as claimed in claim 1, wherein the amount of the tert-butylbenzene derivative having the formula (I) is 0.1 to 20% by weight, based upon the weight of the non-aqueous electrolyte.

3. The non-aqueous electrolyte as claimed in claim 1, wherein $R_1$ to $R_5$ in the formula (I) independently represent a hydrogen atom, a $C_1$–$C_{12}$ alkyl group, a $C_3$–$C_6$ cycloalkyl

TABLE I

| | Cathode | Anode | Compound | Amount added (wt %) | Composition of Electrolyte (volume ratio) | Initial discharge capacity (relative value) | 50 cycle retaining rate of the discharge capacity |
|---|---|---|---|---|---|---|---|
| Ex. 1 | LiCoO$_2$ | Artificial graphite | 4-tert-butyltoluene | 2.0 | 1M LiPF$_6$ EC/PC/DEC = 30/5/65 | 1.03 | 92.2 |
| Ex. 2 | LiCoO$_2$ | Artificial graphite | 4-tert-butyltoluene | 5.0 | 1M LiPF$_6$ EC/PC/DEC = 30/5/65 | 1.02 | 91.7 |
| Ex. 3 | LiCoO$_2$ | Artificial graphite | 4-tert-butyltoluene | 0.5 | 1M LiPF$_6$ EC/PC/DEC = 30/5/65 | 1.01 | 90.1 |
| Comp. Ex. 1 | LiCoO$_2$ | Artificial graphite | None | 0 | 1M LiPF$_6$ EC/PC/DEC = 30/5/65 | 1.00 | 82.6 |
| Ex. 4 | LiCoO$_2$ | Artificial graphite | tert-butylbenzene | 2.0 | 1M LiPF$_6$ EC/PC/DEC = 30/5/65 | 1.02 | 91.8 |
| Ex. 5 | LiCoO$_2$ | Artificial graphite | 4-tert-butyl-m-xylene | 2.0 | 1M LiPF$_6$ EC/PC/DEC = 30/5/65 | 1.02 | 91.6 |
| Ex. 6 | LiCoO$_2$ | Natural graphite | 4-tert-butyltoluene | 2.0 | 1M LiPF$_6$ EC/PC/DEC/DMC = 30/5/30/35 | 1.02 | 92.6 |
| Ex. 7 | LiNi$_{0.8}$Co$_{0.2}$O$_2$ | Artificial graphite | 4-tert-butyltoluene | 2.0 | 1M LiPF$_6$ EC/PC/MEC/DMC = 30/5/50/15 | 1.15 | 90.8 |
| Ex. 8 | LiMn$_2$O$_4$ | Artificial graphite | 4-tert-butyltoluene | 2.0 | 1M LiBF$_4$ EC/PC/DEC/DMC = 30/5/30/35 | 0.99 | 92.3 |
| Ex. 9 | LiCoO$_2$ | Artificial graphite | 4,4'-di-tert-butylbiphenyl | 2.0 | 1M LiPF$_6$ EC/PC/DEC = 30/5/65 | 1.01 | 91.1 |
| Ex. 10 | LiCoO$_2$ | Artificial graphite | 1,3-di-tert-butylbenzene | 2.0 | 1M LiPF$_6$ EC/PC/DEC = 30/5/65 | 1.02 | 92.5 |
| Ex. 11 | LiCoO$_2$ | Artificial graphite | 1,3,5-tri-tert-butylbenzene | 2.0 | 1M LiPF$_6$ EC/PC/DEC = 30/5/65 | 1.02 | 92.4 |
| Ex. 12 | LiCoO$_2$ | Natural graphite | 3,5-di-tert-butyltoluene | 2.0 | 1M LiPF$_6$ EC/PC/DEC = 30/5/65 | 1.02 | 92.5 |

Note that the present invention is not limited to the Examples described. Various combinations which can be easily deduced from the gist of the present invention are possible. In particular, the combinations of the solvents of the above Examples are not limitative. Further, although the above Examples are related to coin batteries, the present invention may also be applied to cylindrical or prismatic batteries.

group, a phenyl group, a benzyl group and an alkyl-group substituted phenyl or benzyl group having 7 to 12 total carbon atoms.

4. The non-aqueous electrolyte as claimed in claim 1, wherein said tert-butylbenzene derivative is at least one compound selected from the group consisting of tert-butylbenzene, 2-tert-butyltoluene, 3-tert-butyltoluene, 4-tert-butyltoluene, 1-(tert-butyl)-2-ethylbenzene, 1-(tert-butyl)-3-ethylbenzene, 1-(tert-butyl)-4-ethylbenzene, 3-tert-butyl-o-xylene, 4-tert-butyl-o-xylene, 4-tert-butyl-m-xylene, 5-tert-butyl-m-xylene, 2-tert-butyl-p-xylene, 3-iso-propyl-1-tert-butylbenzene, 4-iso-propyl-1-tert-butylbenzene, 4-n-butyl-1-tert-butylbenzene, 4-iso-butyl-1-tert-butylbenzene, 4-sec-butyl-1-tert-butylbenzene, 3-cyclohexyl-1-tert-butylbenzene, 4-cyclohexyl-1-tert-butylbenzene, 4,4'-di-tert-butyldiphenylmethane, 4,4'-di-tert-butylbiphenyl, 1,3-di-tert-butylbenzene, 1,4-di-tert-butylbenzene, 1,2,4-tri-tert-butylbenzene, 1,2,3-tri-tert-butylbenzene, 1,3,5-tri-tert-butylbenzene, 1,2,3,5-tetra-tert-butylbenzene, 1,2,3,4-tetra-tert-butylbenzene, 1,2,4,5-tetra-tert-butylbenzene, and 3,5-di-tert-butyltoluene.

5. The non-aqueous electrolyte as claimed in claim 1, wherein said non-aqueous solvent is composed of at least one high dielectric constant solvent and at least one low viscosity solvent in a ratio by volume (high dielectric constant solvent:low viscosity solvent) of 1:9 to 4:1.

6. The non-aqueous electrolyte as claimed in claim 1, wherein said electrolyte salt is at least one compound selected from the group consisting of $LiPF_6$, $LiBF_4$, $LiClO_4$, $LiN(SO_2CF_3)_2$, $LiN(SO_2C_2F_5)_2$, $LiC(SO_2CF_3)_3$, $LiPF_3(CF_3)_3$, $LiPF_3(C_2F_5)_3$, $LiPF_4(C_2F_5)_2$, $LiPF_3(iso-C_3F_7)_3$ and $LiPF_5(iso-C_3F_7)$.

7. The non-aqueous electrolyte as claimed in claim 1, wherein $R_1$, $R_2$, $R_3$, $R_4$ and $R_5$ in the formula (I) are hydrogen atoms.

8. The non-aqueous electrolyte as claimed in claim 1, wherein at least one of $R_1$, $R_2$, $R_3$, $R_4$ and $R_5$ in the formula (I) is not a hydrogen atom.

9. A lithium secondary battery comprising a cathode, an anode, and a non-aqueous electrolyte containing a non-aqueous solvent, an electrolyte salt dissolved therein, and a tert-butylbenzene derivative having the formula (I):

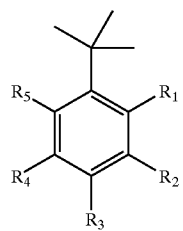

(I)

wherein $R_1$, $R_2$, $R_3$, $R_4$ and $R_5$ independently represent a hydrogen atom or $C_1$ to $C_{12}$ hydrocarbon group.

10. The lithium secondary battery as claimed in claim 9, wherein the amount of the tert-butylbenzene derivative having the formula (I) is 0.1 to 20% by weight, based upon the weight of the non-aqueous electrolyte.

11. The lithium secondary battery as claimed in claim 9, wherein $R_1$ to $R_5$ in the formula (I) independently represent a hydrogen atom, a $C_1$–$C_{12}$ alkyl group, a $C_3$–$C_6$ cycloalkyl group, a phenyl group, a benzyl group and an alkyl-group substituted phenyl or benzyl group having 7 to 12 total carbon atoms.

12. The lithium secondary battery as claimed in claim 9, wherein said tert-butylbenzene derivative is at least one compound selected from the group consisting of tert-butylbenzene, 2-tert-butyltoluene, 3-tert-butyltoluene, 4-tert-butyltoluene, 1-(tert-butyl)-2-ethylbenzene, 1-(tert-butyl)-3-ethylbenzene, 1-(tert-butyl)-4-ethylbenzene, 3-tert-butyl-o-xylene, 4-tert-butyl-o-xylene, 4-tert-butyl-m-xylene, 5-tert-butyl-m-xylene, 2-tert-butyl-p-xylene, 3-iso-propyl-1-tert-butylbenzene, 4-iso-propyl-1-tert-butylbenzene, 4-n-butyl-1-tert-butylbenzene, 4-iso-butyl-1-tert-butylbenzene, 4-sec-butyl-1-tert-butylbenzene, 3-cyclohexyl-1-tert-butylbenzene, 4-cyclohexyl-1-tert-butylbenzene, 4,4'-di-tert-butyldiphenylmethane, 4,4'-di-tert-butylbiphenyl, 1,3-di-tert-butylbenzene, 1,4-di-tert-butylbenzene, 1,2,4-tri-tert-butylbenzene, 1,2,3-tri-tert-butylbenzene, 1,3,5-tri-tert-butylbenzene, 1,2,3,5-tetra-tert-butylbenzene, 1,2,3,4-tetra-tert-butylbenzene, 1,2,4,5-tetra-tert-butylbenzene, and 3,5-di-tert-butyltoluene.

13. The lithium secondary battery as claimed in claim 9, wherein said non-aqueous solvent is composed of at least one high dielectric constant solvent and at least one low viscosity solvent in a ratio by volume (high dielectric constant solvent:low viscosity solvent) of 1:9 to 4:1.

14. The lithium secondary battery as claimed in claim 9, wherein said electrolyte salt is at least one compound selected from the group consisting of $LiPF_6$, $LiBF_4$, $LiClO_4$, $LiN(SO_2CF_3)_2$, $LiN(SO_2C_2F_5)_2$, $LiC(SO_2CF_3)_3$, $LiPF_3(CF_3)_3$, $LiPF_3(C_2F_5)_3$, $LiPF_4(C_2F_5)_2$, $LiPF_3(iso-C_3F_7)_3$ and $LiPF_5(iso-C_3F_7)$.

15. The lithium secondary battery as claimed in claim 9, wherein the cathode is composed of a complex metal oxide of at least one metal selected from the group consisting of cobalt, manganese, nickel, iron and vanadium with lithium.

16. The lithium secondary battery as claimed in claim 9, wherein the anode is at least one anode active material selected from the group consisting of lithium metal, lithium alloy and a carbonaceous material having a lattice spacing ($d_{002}$) of the lattice face (002) of 0.335 to 0.340 nm.

17. The lithium secondary battery as claimed in claim 9, wherein $R_1$, $R_2$, $R_3$, $R_4$ and $R_5$ in the formula (I) are hydrogen atoms.

18. The lithium secondary battery as claimed in claim 9, wherein at least one of $R_1$, $R_2$, $R_3$, $R_4$ and $R_5$ in the formula (I) is not a hydrogen atom.

* * * * *